(12) United States Patent
Inoue et al.

(10) Patent No.: US 8,310,108 B2
(45) Date of Patent: Nov. 13, 2012

(54) NON-CONTACT ELECTRIC POWER SUPPLYING EQUIPMENT, NON-CONTACT ELECTRIC POWER RECEIVING DEVICE, AND NON-CONTACT ELECTRIC POWER SUPPLYING SYSTEM

(75) Inventors: Takumi Inoue, Nukata-gun (JP); Hiroyuki Sakakibara, Hekinan (JP); Shinji Ichikawa, Toyota (JP)

(73) Assignees: Nippon Soken, Inc., Nishio-Shi (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/146,768

(22) PCT Filed: Jun. 3, 2009

(86) PCT No.: PCT/JP2009/060107
§ 371 (c)(1),
(2), (4) Date: Jul. 28, 2011

(87) PCT Pub. No.: WO2010/119577
PCT Pub. Date: Oct. 21, 2010

(65) Prior Publication Data
US 2012/0098348 A1    Apr. 26, 2012

(30) Foreign Application Priority Data

Apr. 13, 2009    (JP) .................................. 2009-096993

(51) Int. Cl.
*H01F 27/42* (2006.01)
*H01F 38/00* (2006.01)
(52) U.S. Cl. ........................................................ 307/104
(58) Field of Classification Search .................... 307/104
See application file for complete search history.

(56) References Cited

U.S. PATENT DOCUMENTS

| | | |
|---|---|---|
| 7,741,734 B2 | 6/2010 | Joannopoulos et al. |
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |

(Continued)

FOREIGN PATENT DOCUMENTS

AU    2006269374 B2    1/2007
(Continued)

OTHER PUBLICATIONS

Japanese Office Action issued in Application No. JP 2009-096993 dated Oct. 25, 2011 (with English Translation).

(Continued)

*Primary Examiner* — Rexford Barnie
*Assistant Examiner* — Dru Parries
(74) *Attorney, Agent, or Firm* — Oliff & Berridge, PLC

(57) ABSTRACT

Electric power supplying equipment and an electric power receiving device include a primary self resonant coil and a secondary self resonant coil, respectively, resonating through an electromagnetic field to allow the electric power supplying equipment to supply the electric power receiving device with electric power in a non-contact manner. A control device controls a high frequency electric power supply device to control supplying electric power from the primary self resonant coil to the secondary self resonant coil. The control device estimates a distance between the primary self resonant coil and the secondary self resonant coil from an S-parameter S11 varying with the distance between the primary self resonant coil and the secondary self resonant coil, and controls supplying electric power, based on that estimated distance.

20 Claims, 7 Drawing Sheets

U.S. PATENT DOCUMENTS

| | | |
|---|---|---|
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2012/0001492 A9 * | 1/2012 | Cook et al. .................. 307/104 |

FOREIGN PATENT DOCUMENTS

| | | |
|---|---|---|
| AU | 2006269374 C1 | 1/2007 |
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-2001-7730 | 1/2001 |
| JP | A-2009-501510 | 1/2009 |
| JP | A-2009-106136 | 5/2009 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2009/054221 A1 | 4/2009 |

OTHER PUBLICATIONS

Kurs, A. et al., "Wireless Power Transfer via Strongly Coupled Magnetic Resonances," *Science*, Jul. 6, 2007, pp. 83-86, vol. 317.

International Search Report issued in International Application No. PCT/JP2009/060107 on Sep. 15, 2009 (with translation).

* cited by examiner

NON-CONTACT ELECTRIC POWER SUPPLYING EQUIPMENT, NON-CONTACT ELECTRIC POWER RECEIVING DEVICE, AND NON-CONTACT ELECTRIC POWER SUPPLYING SYSTEM

TECHNICAL FIELD

The present invention relates generally to non-contact electric power supplying equipment, non-contact electric power receiving devices and non-contact electric power supplying systems, and particularly to non-contact electric power supplying equipment, non-contact electric power receiving devices and non-contact electric power supplying systems having electric power supplying equipment and an electric power receiving device receiving electric power from the electric power supplying equipment, provided with resonators, respectively, caused to resonate through an electromagnetic field to supply the electric power receiving device with electric power in a non-contact manner.

BACKGROUND ART

Electric vehicles, hybrid vehicles and other electric motored vehicles are gaining large attention as ecologically friendly vehicles. These vehicles have mounted therein an electric motor generating force to drive and thus cause the vehicle to travel, and a rechargeable power storage device storing therein electric power supplied to the electric motor. Note that hybrid vehicles include a vehicle having mounted therein an electric motor and in addition an internal combustion engine together therewith as power sources, and a vehicle having mounted therein a power storage device and in addition a fuel cell together therewith as direct current power supplies for driving the vehicle.

A hybrid vehicle is also known that, as well as an electric vehicle, allows a power supply external to the vehicle to charge a power storage device mounted in the vehicle. For example, a plug-in hybrid vehicle is known. This vehicle allows the power storage device to be charged from a general household power supply through a charging cable connecting a receptacle of a power supply provided in premises and a charging port of the vehicle.

On the other hand, an electric power transfer method without using a power supply cord or an electric power transfer cable, i.e., wireless power transfer, is gaining attention in recent years. There are three wireless electric power transfer techniques known as being promising, which are power transfer through electromagnetic induction, power transfer by microwaves, and power transfer through resonance.

Of these three techniques, power transfer through resonance causes a pair of resonators (e.g., a pair of self resonant coils) to resonate in an electromagnetic field (a near field) to transfer electric power through the electromagnetic field in a non-contact manner, and can transfer large electric power of several kW over a relatively large distance (e.g., of several meters (see Patent Document 1 and Non Patent Document 1 for example).

Citation List
Patent Literature
  PTL 1: WO2007/008646
Non Patent Literature
  NPL 1: Andre Kurs et al., "Wireless Power Transfer via Strongly Coupled Magnetic Resonances", [online], Jul. 6, 2007, Science, volume 317, pp. 83-86, [searched on Aug. 17, 2007], Internet <URL:http://www.sciencemag.org/cgi/reprint/317/5834/83.pdf>

SUMMARY OF INVENTION

Technical Problem

When supplying electric power in a non-contact manner through resonance is applied to an actual system of an electric motored vehicle or the like, simplifying a control system is an issue to be addressed. For example, if whether an electric power receiving device (e.g., a vehicle receiving electric power from electric power supplying equipment) is present or how much distance the electric power supplying equipment has to the electric power receiving device can be determined at the electric power supplying equipment without the necessity of having the electric power supplying equipment and the electric power receiving device communicate with each other, controlling them to communicate with each other can be dispensed with. The above documents, however, do not specifically discuss such an issue. The present invention therefore contemplates non-contact electric power supplying equipment, a non-contact electric power receiving device and a non-contact electric power supplying system that allow a control system to be simplified.

Solution to Problem

The present invention provides non-contact electric power supplying equipment including an electric power transferring resonator, a power supply device, and a control device. The electric power transferring resonator transfers electric power to an electric power receiving device in a non-contact manner by resonating with an electric power receiving resonator of the electric power receiving device through an electromagnetic field. The power supply device is connected to the electric power transferring resonator and generates predetermined high frequency voltage. The control device controls the power supply device to control supplying electric power from the electric power transferring resonator to the electric power receiving resonator. The control device controls supplying electric power based on a characteristic in frequency of an impedance, as seen at an input unit of the electric power transferring resonator toward the electric power receiving resonator, varying with a distance between the electric power transferring resonator and the electric power receiving resonator. Note that the impedance can be converted to an S-parameter S11 by the following expression:

$$S11 = (Z1 - Z0)/(Z1 + Z0) \qquad (1),$$

wherein Z1 indicates an impedance as seen at the input unit of the electric power transferring resonator toward the electric power receiving resonator and Z0 indicates an impedance as seen at the input unit toward the power supply device, and furthermore, Z1 is represented by the following expression using a voltage V1 input to the electric power transferring resonator and a current I1 input to the electric power transferring resonator:

$$Z1 = V1/I1 \qquad (2),$$

and accordingly, the following description will be given with the S-parameter S11, rather than impedance, used in controlling supplying electric power. Preferably, the control device estimates the distance between the electric power transferring resonator and the electric power receiving resonator from the S-parameter S11, and controls supplying electric power, based on that estimated distance.

Preferably, the control device performs supplying the electric power receiving device with electric power when the distance estimated from the S-parameter S11 is equal to or smaller than a predetermined value.

Preferably, the control device estimates the distance between the electric power transferring resonator and the electric power receiving resonator from a characteristic in amplitude of the S-parameter S11 varying with the distance between the electric power transferring resonator and the electric power receiving resonator.

Furthermore, preferably, the control device estimates the distance between the electric power transferring resonator and the electric power receiving resonator from a characteristic of a phase of the S-parameter S11 varying with the distance between the electric power transferring resonator and the electric power receiving resonator.

Preferably, the control device determines from the S-parameter S11 whether the electric power receiving device needs to receive electric power and whether supplying the electric power receiving device with electric power can be done, and if the control device determines that supplying the electric power receiving device with electric power can be done, the control device controls the power supply device to generate a voltage having a resonant frequency determined from a singular point of the S-parameter S11.

Preferably, the non-contact electric power supplying equipment further includes current measurement means and voltage measurement means. The current measurement means detects a current input to the electric power transferring resonator. The voltage measurement means detects a voltage input to the electric power transferring resonator. The control device controls the power supply device to output a predetermined small electric power to the electric power receiving device at a plurality of frequencies in a predetermined frequency band, and calculates the S-parameter S11 from the voltage detected by the voltage measurement means and the current detected by the current measurement means.

Preferably, the electric power transferring resonator includes a primary coil and a primary self resonant coil. The primary coil is connected to the power supply device. The primary self resonant coil is fed with electric power from the primary coil through electromagnetic induction and generates the electromagnetic field.

Furthermore, the present invention provides a non-contact electric power receiving device including an electric power receiving resonator and an impedance variation device. The electric power receiving resonator receives electric power from electric power supplying equipment in a non-contact manner by resonating with an electric power transferring resonator of the electric power supplying equipment through an electromagnetic field. The impedance variation device varies an impedance, depending on whether receiving electric power from the electric power supplying equipment is necessary, so that whether receiving electric power from the electric power supplying equipment is necessary can be determined at the electric power supplying equipment from a characteristic in frequency of the impedance.

Preferably, when receiving electric power from the electric power supplying equipment ends, the impedance variation device varies an input impedance so that that receiving electric power ends can be detected at the electric power supplying equipment from the S-parameter S11.

Furthermore, the present invention provides a non-contact electric power supplying system including: electric power supplying equipment capable of outputting predetermined high frequency electric power; and an electric power receiving device capable of receiving electric power from the electric power supplying equipment in a non-contact manner. The electric power supplying equipment includes a power supply device, an electric power transferring resonator, and a control device. The power supply device generates predetermined high frequency voltage. The electric power transferring resonator is connected to the power supply device, and receives electric power from the power supply device and generates an electromagnetic field. The control device controls the power supply device to control supplying electric power from the electric power transferring resonator to the electric power receiving device. The electric power receiving device includes an electric power receiving resonator for receiving electric power from the electric power transferring resonator in a non-contact manner by resonating with the electric power transferring resonator through the electromagnetic field. The control device controls supplying electric power, based on an S-parameter S11 varying with a distance between the electric power transferring resonator and the electric power receiving resonator.

Preferably, the control device estimates the distance between the electric power transferring resonator and the electric power receiving resonator from the S-parameter S11, and controls supplying electric power, based on that estimated distance.

Preferably, the control device performs supplying the electric power receiving device with electric power when the distance estimated from the S-parameter S11 is equal to or smaller than a predetermined value.

Preferably, the electric power receiving device further includes an impedance variation device configured to be capable of varying an impedance of the electric power receiving device when receiving electric power from the electric power supplying equipment ends. The control device uses a previously obtained characteristic of the S-parameter S11 provided when the impedance variation device varies the impedance in the electric power receiving device, to detect from the S-parameter S11 that the electric power receiving device is varied in impedance as receiving electric power ends, and based on that detected result the control device stops supplying the electric power receiving device with electric power.

Preferably, the electric power transferring resonator includes a primary coil and a primary self resonant coil. The primary coil is connected to the power supply device. The primary self resonant coil is fed with electric power from the primary coil through electromagnetic induction and generates the electromagnetic field. The electric power receiving resonator includes a secondary self resonant coil and a secondary coil. The secondary self resonant coil receives electric power from the primary self resonant coil by resonating with the primary self resonant coil through the electromagnetic field. The secondary coil extracts through electromagnetic induction the electric power received by the secondary self resonant coil.

Advantageous Effects of Invention

The present invention allows electric power to be fed, as controlled based on an S-parameter S11 varying with a distance between an electric power transferring resonator and an electric power receiving resonator. Whether an electric power receiving device is present or how much distance electric power supplying equipment has to the electric power receiving device can be determined at the electric power supplying equipment without the necessity of having the electric power supplying equipment and the electric power receiving device communicate with each other. The present invention can thus eliminate the necessity of controlling the electric power supplying equipment and the electric power receiving device to communicate with each other. This allows a control system to be simplified,

DESCRIPTION OF EMBODIMENTS

Hereinafter reference will be made to the drawings to describe the present invention in embodiments. In the figures, identical or corresponding components are identically denoted and will not be described repeatedly in detail.

Figure 1:
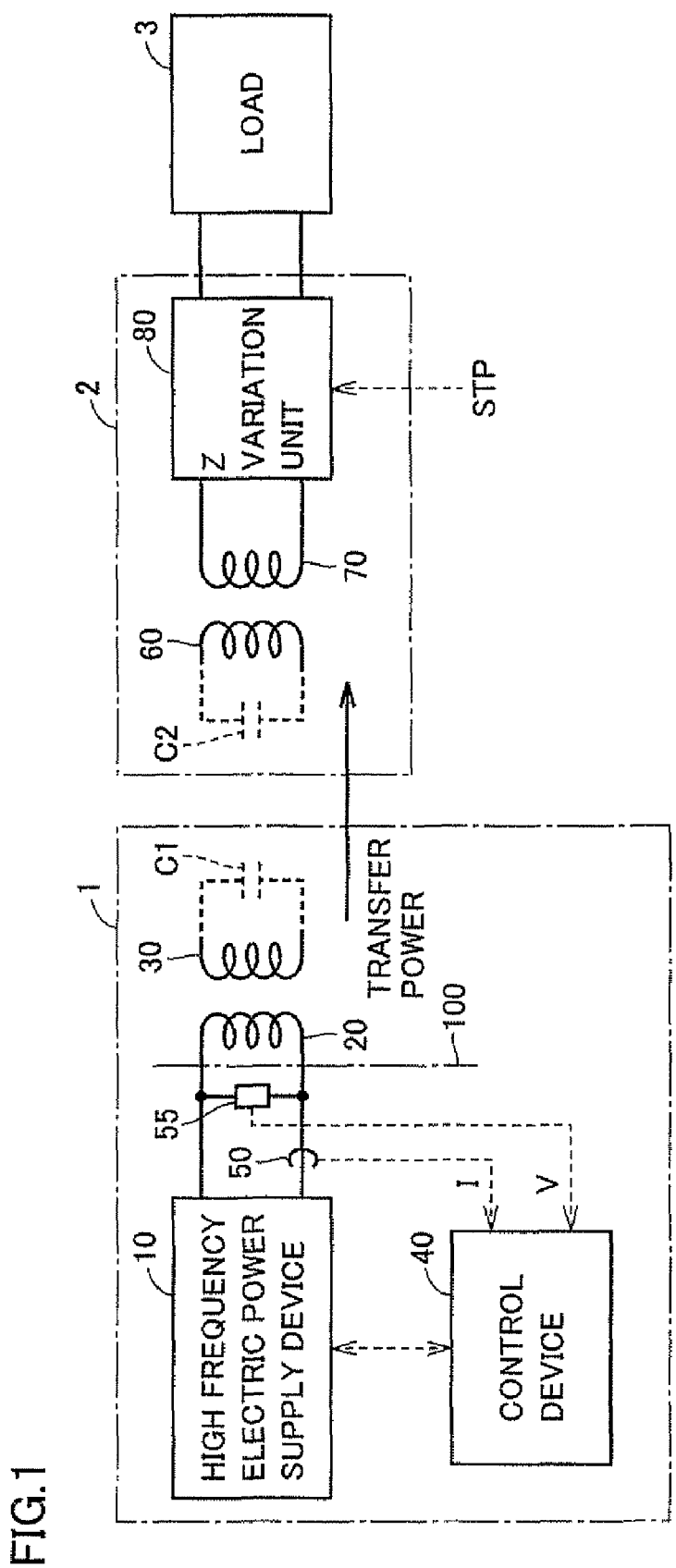
FIG. 1 generally shows in configuration a non-contact electric power supplying system according to an embodiment of the present invention.

FIG. 1 generally shows in configuration a non-contact electric power supplying system according to an embodiment of the present invention. With reference to FIG. 1, the non-contact electric power supplying system includes electric power supplying equipment 1 and an electric power receiving device 2. Electric power supplying equipment 1 includes a high frequency electric power supply device 10, a primary coil 20, a primary self resonant coil 30, a control device 40, current measurement means 50, and voltage measurement means 55.

High frequency electric power supply device 10 is connected to primary coil 20 and operative in response to a drive signal received from control device 40 to generate a predetermined a high frequency voltage (for example of approximately several MHz to less than 20 MHz). High frequency electric power supply device 10 is constituted for example of a sine wave inverter circuit and controlled by control device 40.

Primary coil 20 is provided generally coaxially with primary self resonant coil 30 and configured to be capable of being magnetically coupled with primary self resonant coil 30 through electromagnetic induction, and receives high frequency electric power from high frequency electric power supply device 10 and supplies it to primary self resonant coil 30 through electromagnetic induction.

Primary self resonant coil 30 is an LC resonant coil having opposite ends open (or unconnected) and resonates with a secondary self resonant coil 60, which will be described hereinafter, of electric power receiving device 2 through an electromagnetic field to transfer electric power to electric power receiving device 2 in a non-contact manner. Note that while C1 denotes the stray capacitance of primary self resonant coil 30, an actual capacitor may alternatively be provided.

Current measurement means 50 detects a current I input to primary coil 20 and outputs the detected value to control device 40. Voltage measurement means 55 detects a voltage V input to primary coil 20 and outputs the detected value to control device 40. Current measurement means 50 is for example a current sensor and voltage measurement means 55 is for example a voltage sensor.

Control device 40 generates a drive signal for controlling high frequency electric power supply device 10 and outputs the generated drive signal to high frequency electric power supply device 10 to control high frequency electric power supply device 10 to control supplying electric power from primary self resonant coil 30 to the electric power receiving device 2 secondary self resonant coil 60.

Note that control device 40 estimates a distance between primary self resonant coil 30 and secondary self resonant coil 60 from an S-parameter S11, as seen at an interface 100 toward primary coil 20, varying with the distance between primary self resonant coil 30 and secondary self resonant coil 60 (hereinafter referred to as "said S-parameter S11"), and control device 40 controls supplying electric power, based on the estimated distance. More specifically, when the distance estimated from said S-parameter S11 is equal to or smaller than a predetermined value, control device 40 exerts control to cause electric power supplying equipment 1 to supply electric power receiving device 2 with electric power, and when the distance estimated from said S-parameter S11 is larger than the predetermined value, control device 40 does not exert control to cause electric power supplying equipment 1 to supply electric power receiving device 2 with electric power.

Note that said S-parameter S11 is a coefficient of reflection at an input port of circuitry formed of primary coil 20, primary self resonant coil 30, and the electric power receiving device 2 secondary self resonant coil 60 and secondary coil 70 (or an input of primary coil 20), and it is also calculated when electric power supplying equipment 1 starts to supply electric power receiving device 2 with electric power, and periodically with a predetermined frequency while electric power supplying equipment 1 supplies electric power receiving device 2 with electric power. Note that the S-parameter S11 of the above circuitry has a characteristic, as will be described hereinafter more specifically.

Furthermore, as will be described later, when electric power receiving device 2 finishes receiving electric power, electric power receiving device 2 is accordingly varied in impedance, and control device 40 detects from the S-parameter S11 that electric power receiving device 2 varies in impedance, and in accordance with the detection, control device 40 stops electric power supplying equipment 1 from supplying electric power receiving device 2 with electric power. How control device 40 is configured in function will also be described hereinafter more specifically, Electric power receiving device 2 includes secondary self resonant coil 60, secondary coil 70 and an impedance variation unit 80.

As well as primary self resonant coil 30, secondary self resonant coil 60 is also an LC resonant coil having opposite ends open (or unconnected) and resonates with primary self resonant coil 30 of electric power supplying equipment 1 through an electromagnetic field to receive electric power from electric power supplying equipment 1 in a non-contact manner. Note that while C2 denotes the stray capacitance of secondary self resonant coil 60, an actual capacitor may alternatively be provided.

Secondary coil 70 is provided generally coaxially with secondary self resonant coil 60 and configured to be capable of being magnetically coupled with secondary self resonant coil 60 through electromagnetic induction, and secondary coil 70 extracts the electric power that is received by secondary self resonant coil 60 through electromagnetic induction, and outputs the extracted electric power to a load 3 via impedance variation unit 80.

Impedance variation unit 80 is provided between secondary coil 70 and load 3 and adjusts its own input impedance to be constant when load 3 varies in impedance. As one example, impedance variation unit 80 is a converter capable of adjusting an input impedance.

Furthermore, impedance variation unit 80 varies an input impedance to a predetermined value in response to a signal STP indicating that receiving electric power from electric power supplying equipment 1 ends. In other words, when that receiving electric power from electric power supplying equipment 1 ends is indicated, impedance variation unit 80 varies an impedance of electric power receiving device 2 to a predetermined value. The variation in impedance of electric power receiving device 2 as receiving electric power ends is detected by the electric power supplying equipment I control device 40 from the S-parameter S11.

Note that if load 3 does not vary in impedance, a switch capable of disconnecting an electrical path, a variable impedance device or the like may configure impedance variation unit 80.

Figure 2:
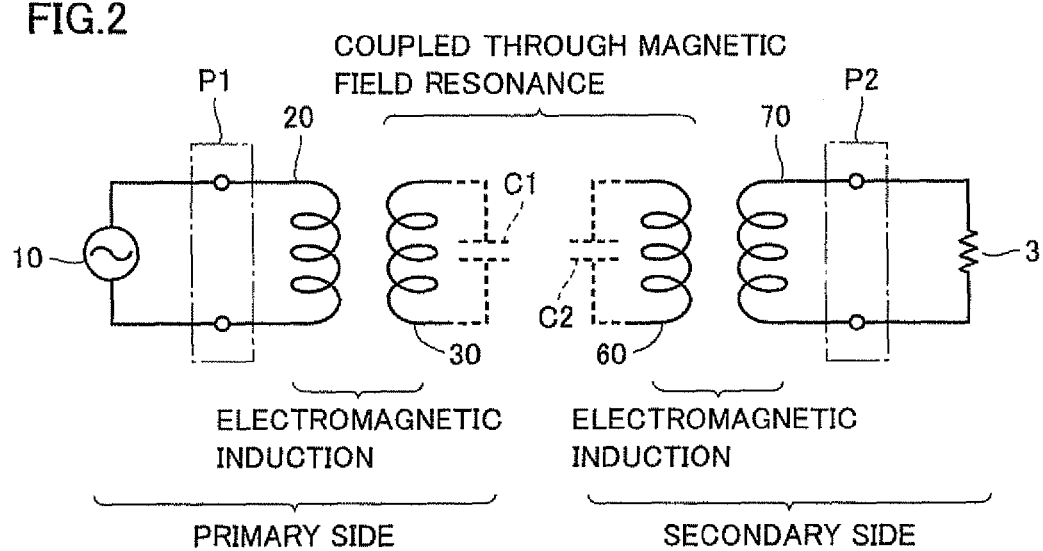
FIG. 2 is an equivalent circuit diagram of a portion involved in transferring electric power through resonance.

FIG. 2 is an equivalent circuit diagram of a portion involved in transferring electric power through resonance. With reference to FIG. 2, power transfer through resonance allows two LC resonant coils having the same natural frequency to resonate, as two tuning forks do, in an electromagnetic field (a near field) to transfer electric power from one coil to the other coil through the electromagnetic field.

More specifically, high frequency electric power supply device 10 is connected to primary coil 20 and supplies high frequency electric power of approximately several MHz to less than 20 MHz to primary self resonant coil 30 magnetically coupled with primary coil 20 through electromagnetic induction. Primary self resonant coil 30 is an LC resonator provided by the coil's own inductance and stray capacitance C1 and resonates with secondary self resonant coil 60 having the same resonant frequency as primary self resonant coil 30 through an electromagnetic field (a near field). This passes energy (electric power) from primary self resonant coil 30 to secondary self resonant coil 60 through the electromagnetic field. The energy (electric power) passed to secondary self resonant coil 60 is extracted by secondary coil 70 magnetically coupled with secondary self resonant coil 60 through electromagnetic induction and is supplied to load 3.

Note that the above S-parameter S11 corresponds to a ratio of electric power reflected at a port P1 to electric power input to port P1 (i.e., electric power output from high frequency electric power supply device 10), i.e., the coefficient of reflection of port P1, for circuitry formed between ports P1 and P2 and constituted of primary coil 20, primary self resonant coil 30, secondary self resonant coil 60 and secondary coil 70.

Figure 3:
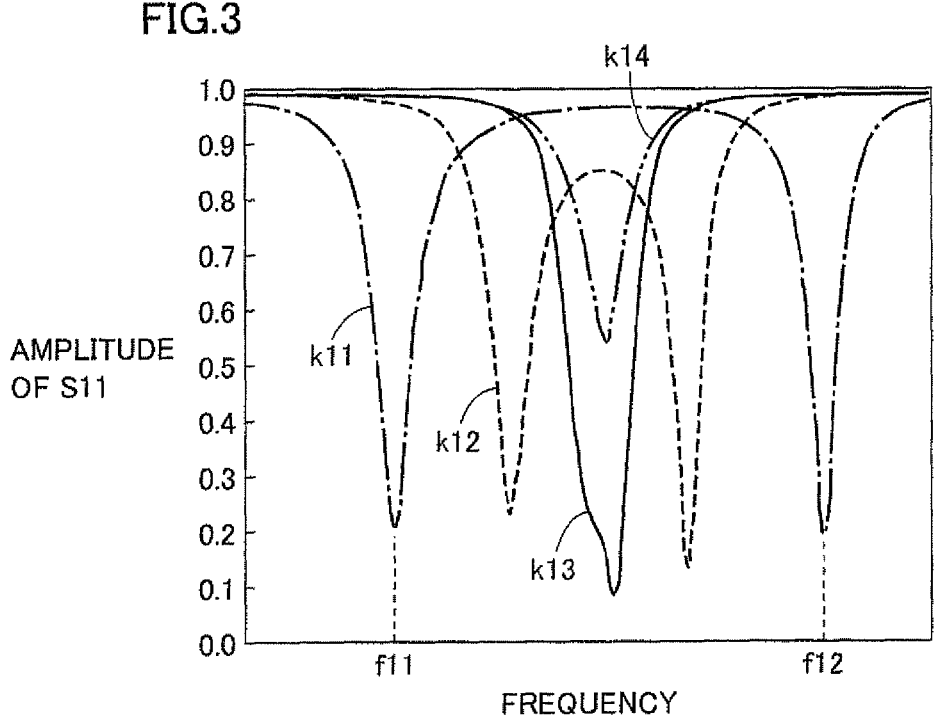
FIG. 3 represents a characteristic of an amplitude of an S-parameter S11 of circuitry shown in FIG. 2.

FIG. 3 represents a characteristic in amplitude of the S-parameter S11 of the Fig. 2 circuitry. With reference to FIG. 3, the axis of ordinates represents the S-parameter S11 in amplitude and the axis of abscissas represents in frequency the high frequency electric power supplied from high frequency electric power supply device 10 to the circuitry. A curve k11 represents a characteristic in amplitude of the S-parameter S11 provided when primary self resonant coil 30 and secondary self resonant coil 60 have a distance D1 therebetween and a curve k12 represents a characteristic in amplitude of the S-parameter S11 provided when primary self resonant coil 30 and secondary self resonant coil 60 have a distance D2 therebetween, wherein D2>D1. Furthermore, a curve k13 represents a characteristic in amplitude of the S-parameter S11 provided when primary self resonant coil 30 and secondary self resonant coil 60 have a distance D3 therebetween, wherein D3>D2, and a curve k14 represents a characteristic in amplitude of the S-parameter S11 provided when primary self resonant coil 30 and secondary self resonant coil 60 have a distance D4 therebetween, wherein D4>D3, Note that curves k11, k12, k13 indicate cases in which primary self resonant coil 30 and secondary self resonant coil 60 have small distances (D1, D2, D3) therebetween and accordingly, electric power supplying equipment 1 can supply electric power receiving device 2 with sufficient electric power, whereas curve k14 indicates a case in which primary self resonant coil 30 and secondary self resonant coil 60 have too large a distance (D4) therebetween and accordingly, electric power supplying equipment 1 cannot supply electric power receiving device 2 with sufficient electric power.

Figure 4:
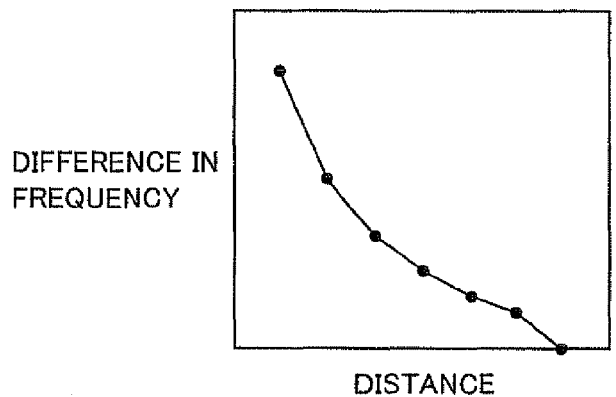
FIG. 4 represents a correlation between a difference in frequency between local minimum points provided as a distance between a primary self resonant coil and a secondary self resonant coil varies, and the distance between the primary self resonant coil and the secondary self resonant coil.
Figure 5:
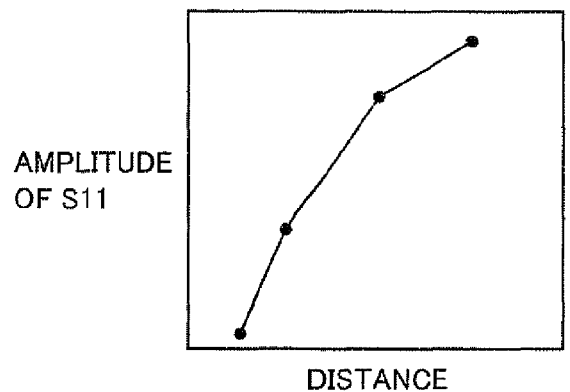
FIG. 5 represents a correlation between an S-parameter S11's amplitude in magnitude provided when the primary self resonant coil and the secondary self resonant coil have therebetween a distance larger than a distance allowing local minimum points to be united to provide a single local minimum point, and the distance between the primary self resonant coil and the secondary self resonant coil.

As shown in FIG. 3, the FIG. 2 circuitry utilizing resonance to transfer electric power has an S-parameter S11 with a characteristic in amplitude providing two local minimum points (or singular points) when primary self resonant coil 30 and secondary self resonant coil 60 get close to each other, and spacing the local minimum points' frequencies (f11, f12) farther apart as the coils get closer to each other. Furthermore, as the coils get farther away from each other, the local minimum points' frequencies (f11, f12) get closer to each other, and when the coils have a distance Db therebetween, the two local minimum points are united as a single local minimum point. Furthermore, as the coils have therebetween a distance farther away from distance Db allowing local minimum points to be united to provide a single local minimum point, the S-parameter S11 increases in amplitude. Accordingly in the present embodiment before electric power supplying equipment 1 starts to supply electric power receiving device 2 with electric power a correlation is previously obtained between a difference in frequency between local minimum points provided as the distance between primary self resonant coil 30 and secondary self resonant coil 60 varies, and the distance between the coils, as shown in FIG. 4, and with reference to the FIG. 4 correlation, when primary self resonant coil 30 and secondary self resonant coil 60 have therebetween a distance smaller than distance Db allowing local minimum points to be united to provide a single local minimum point, the FIG. 2 circuitry's S-parameter S11 is calculated, which has an amplitude indicating local minimum points with a difference in frequency, and therefrom the distance between primary self resonant coil 30 and secondary self resonant coil 60 can be estimated. Alternatively, a correlation is previously obtained between the S-parameter S11's amplitude in magnitude provided when primary self resonant coil 30 and secondary self resonant coil 60 have therebetween a distance larger than distance Db allowing local minimum points to be united to provide a single local minimum point, and the distance between primary self resonant coil 30 and secondary self resonant coil 60, as shown in FIG. 5, and with reference to the FIG. 5 correlation, when primary self resonant coil 30 and secondary self resonant coil 60 have therebetween a distance larger than distance Db allowing local minimum points to be united to provide a single local minimum point, the FIG. 2 circuitry's S-parameter S11 is calculated, which has an amplitude having a magnitude, and therefrom the distance between primary self resonant coil 30 and secondary self resonant coil 60 can be estimated. If the estimated distance is equal to or smaller than a predetermined value, electric power supplying equipment 1 starts to supply electric power receiving device 2 with electric power.

Note that in place of the S-parameter S11's characteristic in amplitude, its phase's characteristic may be used to estimate a distance between primary self resonant coil 30 and secondary self resonant coil 60.

Figure 6:
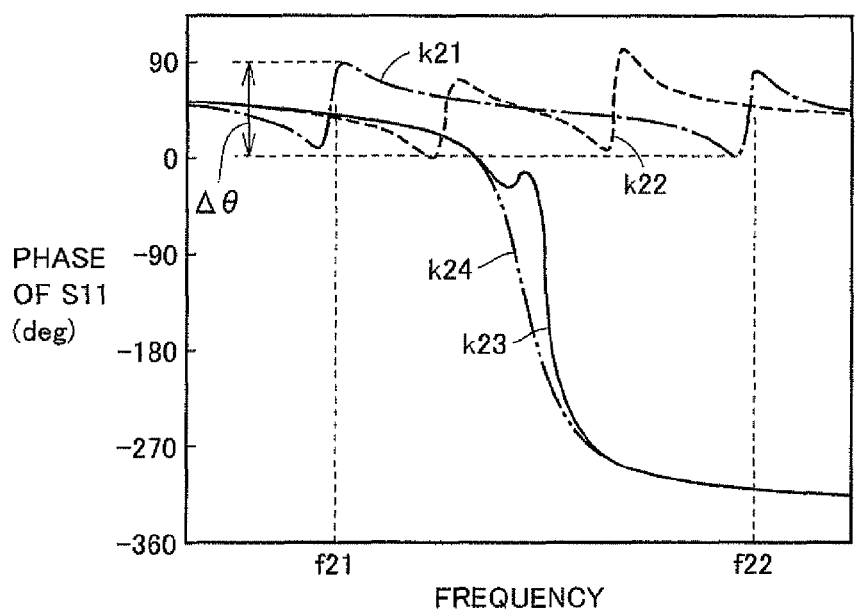
FIG. 6 represents characteristics of phases of the S-parameter S11 of the FIG. 2 circuitry.

FIG. 6 represents characteristics of phases of the S-parameter S11 of the FIG. 2 circuitry. With reference to FIG. 6, the axis of ordinates represents the S-parameter S11's phases and the axis of abscissas represents in frequency the high frequency electric power supplied from high frequency electric power supply device 10 to the circuitry. A curve k21 represents a characteristic of a phase of the S-parameter S11 provided when primary self resonant coil 30 and secondary self resonant coil 60 have distance D1 therebetween, and a curve k22 represents a characteristic of a phase of the S-parameter S11 provided when primary self resonant coil 30 and secondary self resonant coil 60 have distance D2 therebetween, wherein D2>D1. Furthermore, a curve k23 represents a characteristic of a phase of the S-parameter S11 provided when primary self resonant coil 30 and secondary self resonant coil 60 have distance D3, wherein D3>D2, and a curve k24 represents a characteristic of a phase of the S-parameter S11 provided when primary self resonant coil 30 and secondary self resonant coil 60 have distance D4 therebetween, wherein D4>D3.

Note that curves k21, k22, k23 indicate cases in which primary self resonant coil 30 and secondary self resonant coil 60 have small distances (D1, D2, D3) therebetween and accordingly, electric power supplying equipment 1 can supply electric power receiving device 2 with sufficient electric power, whereas curve k24 indicates a case in which primary self resonant coil 30 and secondary self resonant coil 60 have too large distance (D4) therebetween and accordingly, electric power supplying equipment 1 cannot supply electric power receiving device 2 with sufficient electric power.

As shown in FIG. 6, the FIG. 2 circuitry utilizing resonance to transfer electric power has an S-parameter S11 having a phase with a characteristic providing two local minimum points and two local maximum points when primary self resonant coil 30 and secondary self resonant coil 60 get close to each other, and spacing the frequencies (f21, f22) of those points each between a local minimum point and a local maximum point falling within a predetermined range in frequency at which the phase has a characteristic having a variation with a maximum gradient (or the singular points) farther apart as the coils get closer to each other. Furthermore, as the coils get farther away from each other, the frequencies (f21, f22) of those points each between a local minimum point and a local maximum point falling within the predetermined range in frequency at which the phase has a characteristic having a variation with a maximum gradient (or the singular points) get closer to each other, and when the coils have distance Db therebetween, the two local minimum points and the two local maximum points are united to provide a single local minimum point and a single local maximum point. Furthermore, as the coils have a distance farther away from distance Db allowing local minimum points and local maximum points to be united to provide a single local minimum point and a single local maximum point and when a distance Dc is attained, the local minimum and maximum points disappear, and the phase has a characteristic indicating a monotonic function. Within a range in frequency scanned in calculating the S-parameter S11, a phase has a characteristic having a minimum value and a maximum value with a variation range Δθ therebetween, which characteristically increases as the coils get farther away from each other.

Figure 7:
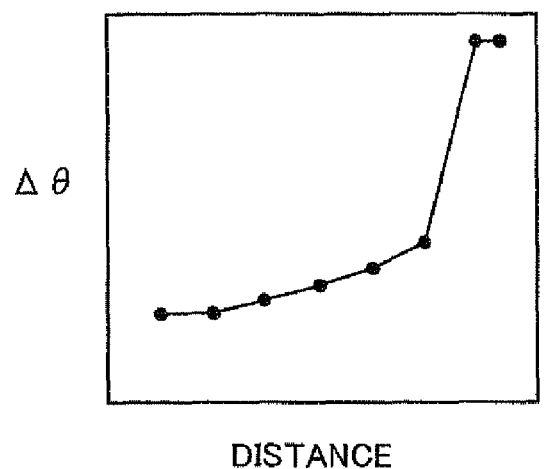
FIG. 7 represents a correlation between a variation range from a minimum value to a maximum value of a characteristic of a phase within a range in frequency scanned in calculating the S-parameter S11, and the distance between the primary self resonant coil and the secondary self resonant coil.

Accordingly, before electric power supplying equipment 1 starts to supply electric power receiving device 2 with electric power, a correlation is previously obtained between a difference in frequency between those points each between a local minimum point and a local maximum point falling within a predetermined range in frequency at which the phase has a characteristic having a variation with a maximum gradient, and the distance between primary self resonant coil 30 and secondary self resonant coil 60, as shown in FIG. 4, and with reference to the FIG. 4 correlation, when primary self resonant coil 30 and secondary self resonant coil 60 have therebetween a distance smaller than distance Db allowing local minimum points and local maximum points to be united to provide a single local minimum point and a single local maximum point, the FIG. 2 circuitry's S-parameter S11 is calculated, which has a phase indicating a difference in frequency between those points each between a local minimum point and a local maximum point falling within the predetermined range in frequency at which the phase has a characteristic having a variation with a maximum gradient, and therefrom the distance between primary self resonant coil 30 and secondary self resonant coil 60 can be estimated. Alternatively, a correlation is previously obtained between variation range Δθ from a minimum value to a maximum value of the characteristic of the phase within a range in frequency scanned in calculating the S-parameter S11 and the distance between primary self resonant coil 30 and secondary self resonant coil 60, as shown in FIG. 7, and with reference to the FIG. 7 correlation, when primary self resonant coil 30 and secondary self resonant coil 60 have therebetween a distance smaller than distance Db allowing local minimum points and local maximum points to be united to provide a single local minimum point and a single local maximum point, the FIG. 2 circuitry's S-parameter S11 is calculated, which has a phase indicating variation range Δθ from a minimum value to a maximum value of the characteristic of the phase within the range in frequency scanned in calculating the S-parameter S11, and therefrom the distance between primary self resonant coil 30 and secondary self resonant coil 60 can be estimated.

Figure 8:
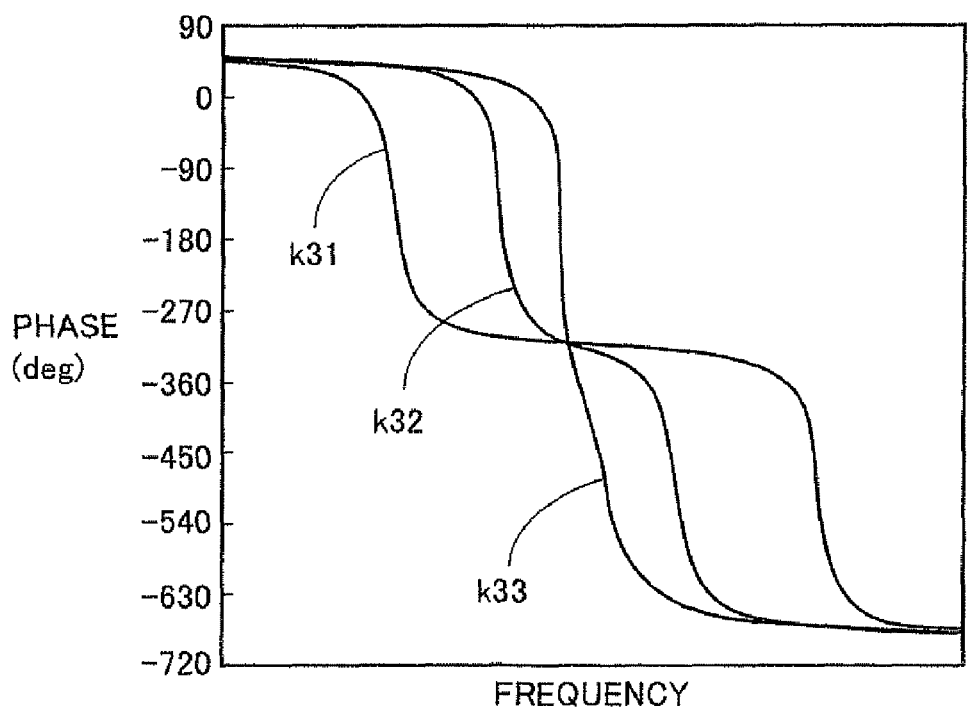
FIG. 8 represents characteristics of phases of the S-parameter S11 provided when an impedance variation unit shown in FIG. 1 opens a line between a secondary coil and a load.

FIG. 8 represents characteristics of phases of the S-parameter S11 provided when impedance variation unit 80 shown in FIG. 1 opens a line between secondary coil 70 and load 3. With reference to FIG. 8, the axis of ordinates represents the S-parameter S11's phase and the axis of abscissas represents in frequency the high frequency electric power supplied from high frequency electric power supply device 10 to the circuitry. A curve 31 represents a characteristic of a phase of the S-parameter S11 provided when primary self resonant coil 30 and secondary self resonant coil 60 have distance D1 therebetween. A curve 32 represents a characteristic of a phase of the S-parameter S11 provided when primary self resonant coil 30 and secondary self resonant coil 60 have distance D2 therebetween, wherein D2>D1. A curve 33 represents a characteristic of a phase of the S-parameter S11 provided when primary self resonant coil 30 and secondary self resonant coil 60 have distance D3 therebetween, wherein D3>D2. As shown in FIG. 8, the FIG. 2 circuitry utilizing resonance to transfer electric power has an S-parameter S11 having a phase with a characteristic characteristically represented by a monotonous function regardless of the distance between primary self resonant coil 30 and secondary self resonant coil 60.

When electric power receiving device 2 (see FIG. 1) finishes receiving electric power, electric power receiving device 2 accordingly has its impedance varied to a predetermined value, and the S-parameter S11's phase accordingly has a characteristic varying as shown in FIG. 8. Accordingly, in the present embodiment, when electric power receiving device 2 finishes receiving electric power, the FIG. 2 circuitry's S-parameter S11 is calculated, and if the S-parameter S11 calculated has a phase having a characteristic indicating a monotonous function, the fact that electric power receiving device 2 varies in impedance, i.e., the fact that receiving electric power ends, can be detected in electric power supplying equipment 1.

Figure 9:
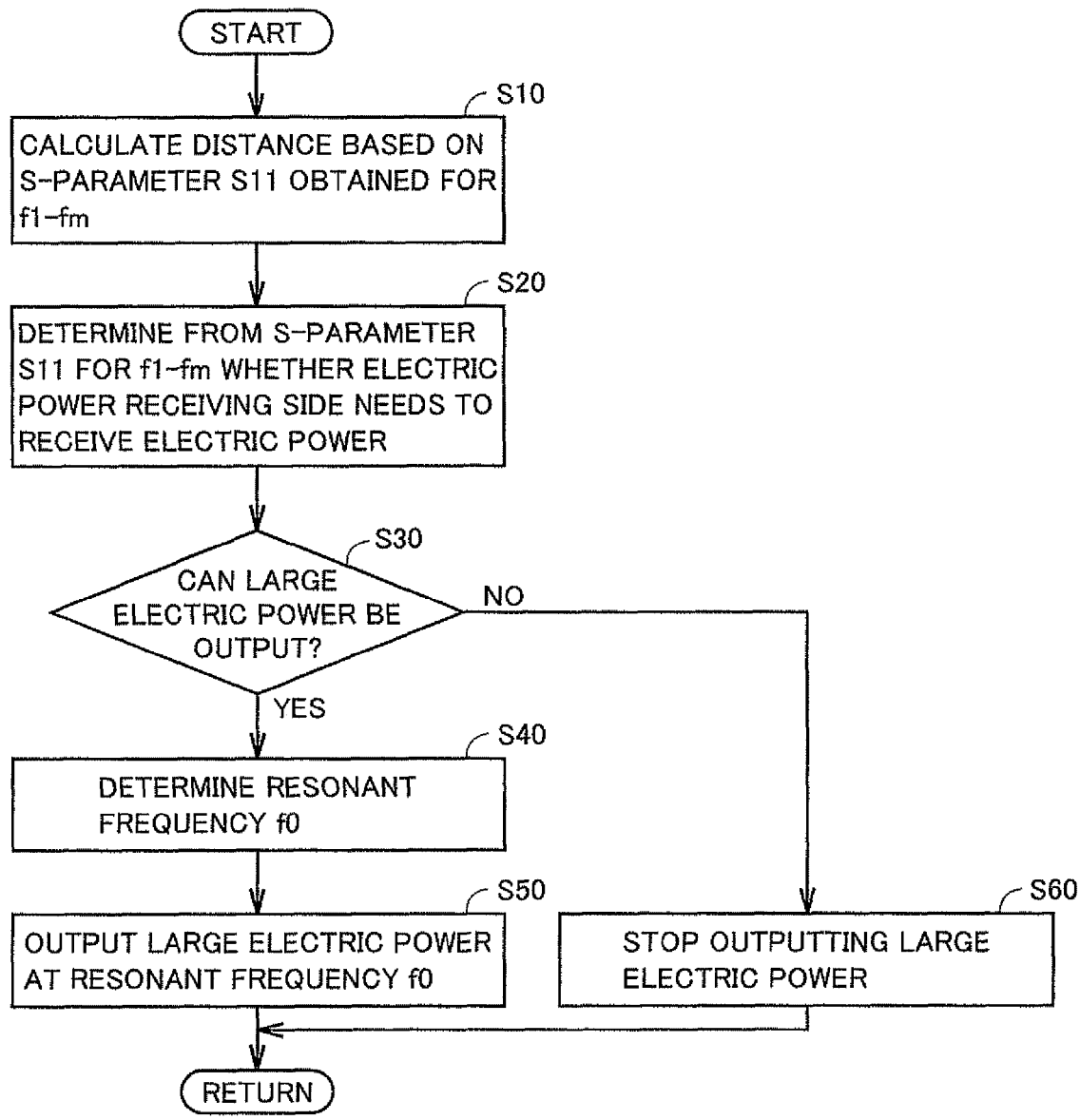
FIG. 9 is a flowchart of a procedure of a process performed by the FIG. 1 control device to control supplying electric power.

FIG. 9 is a flowchart of a procedure of a process performed by the FIG. 1 control device 40 to control supplying electric power. Note that this process is called from a main routine and performed whenever a predetermined period of time elapses or a predetermined condition is established.

With reference to FIG. 9, control device 40 uses an S-parameter S11 obtained through an S-parameter S11 calculation process, as will be described hereinafter, for a scanned frequency f1-fm to calculate a distance between primary self resonant coil 30 and secondary self resonant coil 60, wherein m is a natural number equal to or larger than 2 (step S10). For example, as has been described with reference to FIGS. 3 and 6, the distance between primary self resonant coil 30 and secondary self resonant coil 60 can be estimated from a characteristic of an amplitude or phase of the S-parameter S11.

Control device 40 then determines from the S-parameter S11 for scanned frequency f1-fm whether electric power receiving device 2 (see FIG. 1) needs to receive electric power (step S20). For example, as has been described with reference to FIG. 8, a characteristic of a phase of the S-parameter S11 calculated is compared with that of the FIG. 8 phase, and from a result obtained therefrom whether electric power receiving device 2 needs to receive electric power is determined.

Control device 40 then determines whether electric power supplying equipment 1 can output large electric power (or regularly supply electric power) to electric power receiving device 2 (step S30). More specifically, if control device 40 determines in step S10 that primary self resonant coil 30 and secondary self resonant coil 60 have therebetween a distance equal to or smaller than a predetermined value and control device 40 also determines in step S20 that electric power receiving device 2 requires to receive electric power, control device 40 determines that electric power supplying equipment 1 can output large electric power to electric power receiving device 2. Note that the predetermined value is set at a value allowing electric power supplying equipment 1 to supply electric power receiving device 2 with electric power.

Once control device 40 has determined in step S30 that electric power supplying equipment 1 can output large electric power to electric power receiving device 2 (YES in step S30), control device 40 determines a resonant frequency f0 based on the S-parameter S11 calculated (step S40). Resonant frequency f0 is a frequency corresponding to a local minimum point appearing in a characteristic of an amplitude of the S-parameter S11 or that point appearing in a characteristic of a phase of the S-parameter S11 between a local minimum point and a local maximum point falling within a predetermined range in frequency at which the phase has a characteristic having a variation with a maximum gradient.

Control device 40 then generates a drive signal for controlling high frequency electric power supply device 10 and outputs the drive signal to high frequency electric power supply device 10 to cause high frequency electric power supply device 10 to output to electric power receiving device 2 large electric power having resonant frequency f0 as determined (or regularly supply electric power receiving device 2 with electric power) (step S50).

If control device 40 determines in step S30 that electric power supplying equipment 1 cannot output large electric power to electric power receiving device 2 (NO in step S30), outputting large electric power is stopped (step S60). Note that when electric power supplying equipment 1 currently does not output large electric power to electric power receiving device 2, outputting large electric power is prohibited.

Figure 10:
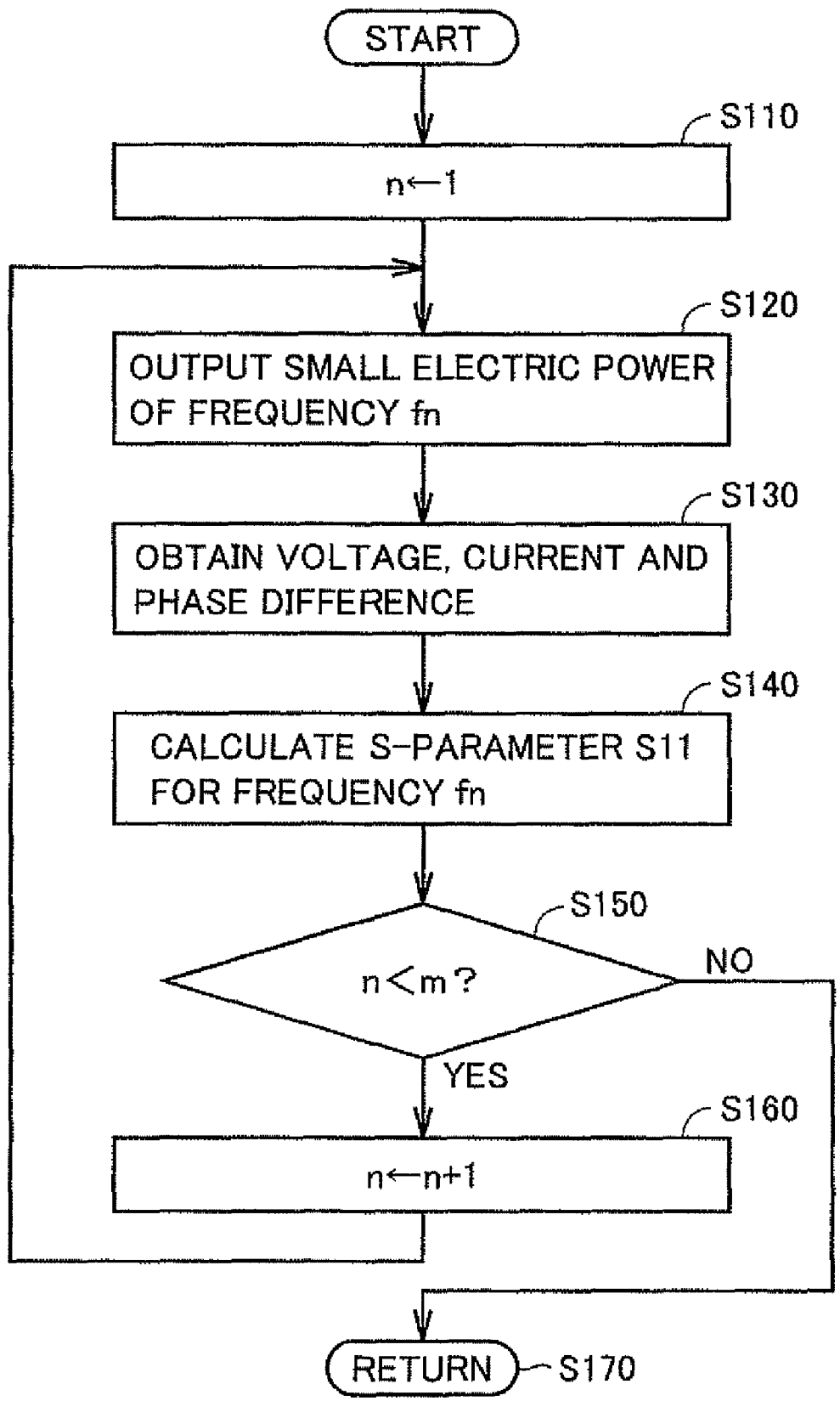
FIG. 10 is a flowchart of a procedure of an S-parameter S11 calculation process performed by the control device.

FIG. 10 is a flowchart of the procedure of the S-parameter S11 calculation process performed by control device 40. An S-parameter S11 is obtained by scanning a predetermined frequency band at predetermined intervals. More specifically, a range in frequency, such as shown in FIGS. 6 and 8, is set as the predetermined frequency band, and an S-parameter S11 is calculated for each of m frequencies scanned in the set frequency band and sequentially varying at predetermined intervals. Note that the FIG. 10 process interrupts the FIG. 9 electric power supplying controlling process in cycles as predetermined and is performed in a period sufficiently shorter than that of the FIG. 9 process.

With reference to FIG. 10, control device 40 initially sets a count value n at 1 (step S110). Control device 40 then generates a drive signal for controlling high frequency electric power supply device 10 and outputs the drive signal, to high frequency electric power supply device 10 to cause high frequency electric power supply device 10 to output to electric power receiving device 2 small electric power having a scanned frequency fn (i.e., electric power smaller than that regularly fed) (step S120).

Control device 40 then obtains a value detected by current measurement means 50 and indicating current I input to primary coil 20 and a value detected by voltage measurement means 55 and indicating voltage V input to primary coil 20, and also obtains a phase difference (step S130). Control device 40 then uses the obtained information to calculate an S-parameter S11 for scanned frequency fn by the following expression (step S140):

$$S11=((V/I)-Z0)/((V/I)+Z0) \quad (3)$$

wherein Z0 represents an impedance as seen at the electric power input unit of primary coil 20 toward high frequency electric power supply device 10. Once an S-parameter S11 has been calculated for scanned frequency fn, control device 40 determines whether count value n is smaller than m (step S150). If so (YES in step S150), control device 40 sets count value n at (n+1) (step S160), and proceeds to step S120. Otherwise (NO in step S150), control device 40 proceeds to step S170 and a series of steps thus ends.

Note that the above control can similarly be implemented with a technique employing a directional coupler, such as a network analyzer, to calculate an S-parameter S11. Furthermore, the above control can similarly be implemented with an S-parameter replaced with a Z-parameter, a Y-parameter or the like.

Figure 11:
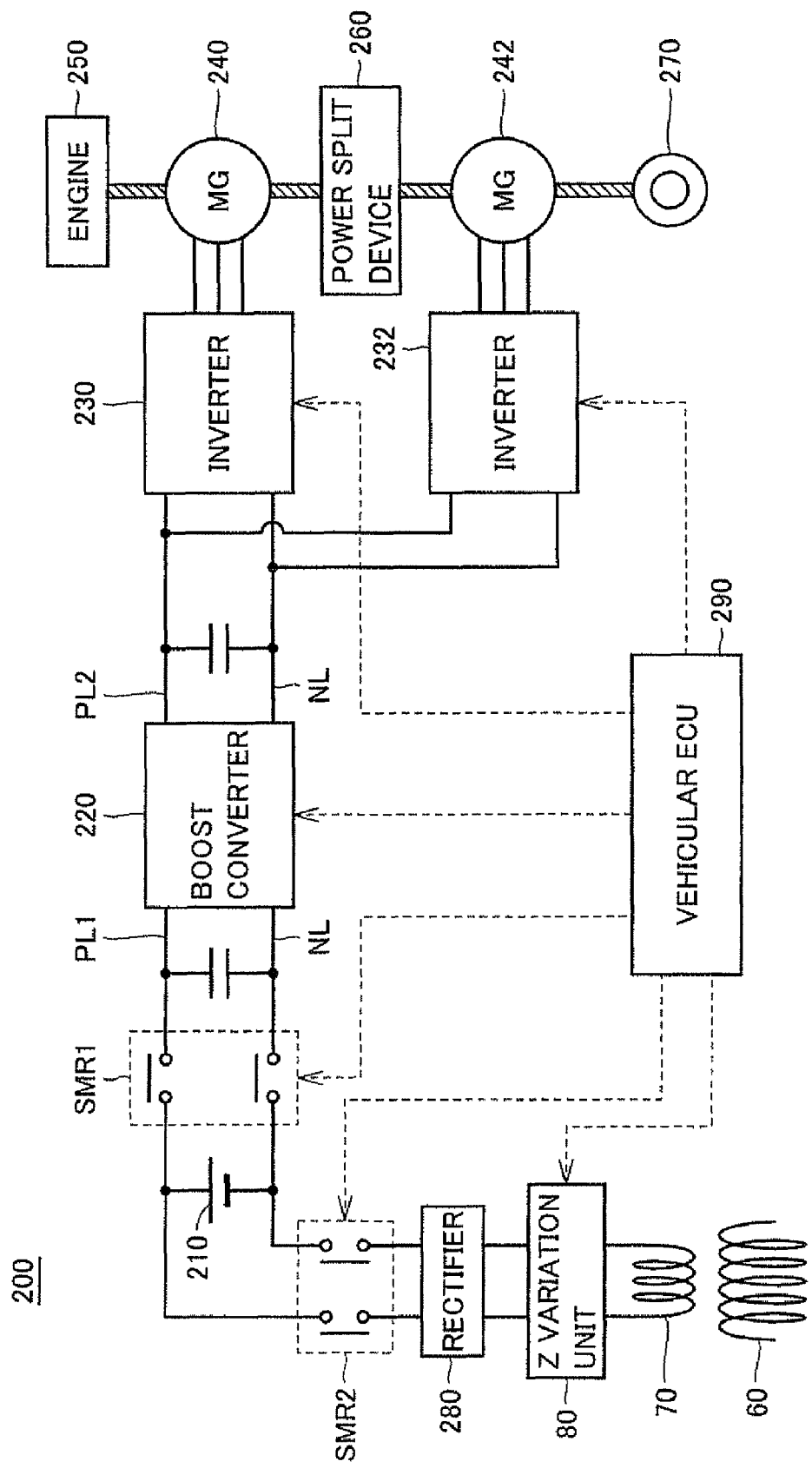
FIG. 11 shows in configuration a hybrid vehicle indicated as one example of an electric motored vehicle having mounted therein an electric power receiving device shown in FIG. 1.

FIG. 11 shows in configuration a hybrid vehicle indicated as one example of an electric motored vehicle having mounted therein electric power receiving device 2 shown in FIG. 1. With reference to FIG. 11, a hybrid vehicle 200 includes a power storage device 210, a system main relay SMR1, a boost converter 220, inverters 230, 232, motor generators 240, 242, an engine 250, a power split device 260, and a drive wheel 270. Furthermore, hybrid vehicle 200 also includes secondary self resonant coil 60, secondary coil 70, impedance variation unit 80, a rectifier 280, a system main relay SMR2, and a vehicular ECU 290.

Hybrid vehicle 200 has engine 250 and motor generator 242 mounted therein as power sources. Engine 250 and motor generators 240, 242 are coupled with power split device 260. Hybrid vehicle 200 travels on driving force generated by at least one of engine 250 and motor generator 242. Power generated by engine 250 is split by power split device 260 to two paths: one is a path transmitting power to drive wheel 270 and the other is a path transmitting power to motor generator 240.

Motor generator 240 is an alternate current rotating electric machine and is for example a 3-phase alternate current synchronous electric motor having a rotor with a permanent magnet embedded therein. Motor generator 240 uses kinetic energy of engine 250 through power split device 260 to generate electric power. For example, when power storage device 210 has a state of charge (SOC) smaller than a predetermined value, engine 250 is started and motor generator 240 generates electric power to charge power storage device 210.

Motor generator 242 is also an alternate current rotating electric machine and is, as well as motor generator 240, for example a 3-phase alternate current synchronous electric motor having a rotor with a permanent magnet embedded therein. Motor generator 242 uses at least one of electric power stored in power storage device 210 and electric power generated by motor generator 240 to generate driving force which is in turn transmitted to drive wheel 270.

Furthermore, when the vehicle is braked or travels downhill and its acceleration is reduced or the like, mechanical energy stored in the vehicle as kinetic energy, potential energy and the like is used via drive wheel 270 to drive motor generator 242 to rotate motor generator 242 to allow motor generator 242 to operate as an electric power generator. Motor generator 242 thus operates as a regenerative brake converting traveling energy to electric power and generating braking force. The electric power generated by motor generator 242 is stored to power storage device 210.

Power split device 260 is constituted of a planetary gear including a sun gear, a pinion gear, a carrier, and a ring gear. The pinion gear engages with the sun gear and the ring gear. The carrier supports the pinion gear to be capable of revolving and is also coupled with a crankshaft of engine 250. The sun gear is coupled with a shaft of rotation of motor generator 240. The ring gear is coupled with a shaft of rotation of motor generator 242 and drive wheel 270.

System main relay SMR1 is provided between power storage device 210 and boost converter 220 and operates in response to a signal received from vehicular ECU 290 to electrically connect power storage device 210 to boost converter 220. Boost converter 220 boosts the voltage on a positive electrode line PL2 to a voltage equal to or larger than that output from power storage device 210. Note that boost converter 220 is constituted for example of a direct current chopper circuit. Inverters 230, 232 drive motor generators 240, 242, respectively. Note that inverter 230, 232 is constituted for example of a 3-phase bridge circuit.

Secondary self resonant coil 60, secondary coil 70 and impedance variation unit 80 are provided as has been described with reference to FIG. 1. Rectifier 280 rectifies alternate current electric power extracted by secondary coil 70. System main relay SMR2 is provided between rectifier 280 and power storage device 210 and operates in response to a signal received from vehicular ECU 290 to electrically connect rectifier 280 to power storage device 210.

Vehicular ECU 290 in a traveling mode turns on and off system main relays SMR1 and SMR2, respectively, and when the vehicle travels, vehicular ECU 290 operates in accordance with an accelerator pedal position, the vehicle's speed and other signals received from a variety of sensors to generate a signal for driving boost converter 220 and motor generators 240, 242 and output the generated signal to boost converter 220 and inverters 230, 232.

Furthermore, when electric power supplying equipment 1 (see FIG. 1) supplies hybrid vehicle 200 with electric power, vehicular ECU 290 turns on system main relay SMR2. This allows electric power that is received by secondary self resonant coil 60 to be supplied to power storage device 210. When power storage device 210 attains an SOC exceeding an upper limit value, vehicular ECU 290 outputs an instruction to impedance variation unit 80 to vary impedance. Note that the fact that impedance variation unit 80 has varied impedance is detected in electric power supplying equipment 1 from the S-parameter 511, and supplying electric power from electric power supplying equipment 1 to hybrid vehicle 200 is stopped.

Note that system main relays SMR1 and SMR2 can also both be turned on to receive electric power from electric power supplying equipment 1 while the vehicle travels.

Note that if impedance variation unit 80 is a relay switch, system main relay SMR2 may be dispensed with. Furthermore, a DC/DC converter may be provided between rectifier 280 and power storage device 210 to convert the direct current electric power rectified by rectifier 280 into the level in voltage of power storage device 210.

Thus in the present embodiment an S-parameter S11 varying with a distance between primary self resonant coil 30 and secondary self resonant coil 60 is used to estimate the distance between primary self resonant coil 30 and secondary self resonant coil 60, and supplying electric power is controlled based on the distance thus estimated. Whether electric power receiving device 2 is present or how much distance electric power supplying equipment 1 has to electric power receiving device 2 can be determined at electric power supplying equipment 1 without the necessity of having electric power supplying equipment 1 and electric power receiving device 2 communicate with each other. Furthermore, in the present embodiment, when electric power receiving device 2 finishes receiving electric power, electric power receiving device 2 is varied in impedance, and the variation in impedance is detected at electric power supplying equipment 1 from an S-parameter S11. The fact that electric power receiving device 2 finishes receiving electric power can thus be detected at electric power supplying equipment 1 without the necessity of having electric power supplying equipment 1 and electric power receiving device 2 communicate with each other. The present embodiment can thus eliminate the necessity of controlling electric power supplying equipment 1 and electric power receiving device 2 to communicate with each other. As a result, a simplified control system can be achieved.

Note that while in the above embodiment an S-parameter S11 is used to estimate a distance between primary self resonant coil 30 and secondary self resonant coil 60 and supplying electric power is controlled based on the estimated distance, the distance between primary self resonant coil 30 and secondary self resonant coil 60 may not be estimated and the S-parameter 511 may directly be used to control supplying electric power. For example, whether to supply electric power can be determined with reference to the S-parameter S11's threshold value predetermined based on the distance between primary self resonant coil 30 and secondary self resonant coil 60 to eliminate the necessity of estimating the distance between primary self resonant coil 30 and secondary self resonant coil 60 and thus use the S-parameter S11 to control supplying electric power.

Furthermore in the above embodiment impedance variation unit 80 is adapted to adjust its input impedance to have a fixed value when the load 3 impedance varies. This function, however, is not essential. When the load 3 impedance varies, resonant frequency would vary, and an error is introduced into the distance between primary self resonant coil 30 and secondary self resonant coil 60 estimated from the S-parameter S11 If this error can be tolerated, however, then a function adjusting an input impedance to have a fixed value as the load 3 impedance varies is unnecessary, and impedance variation unit 80 is only required to have a function operating in response to signal STP indicating that receiving electric power from electric power supplying equipment 1 ends to vary an input impedance to a predetermined value. Furthermore, if the load 3 impedance inherently does not vary, the distance between primary self resonant coil 30 and secondary self resonant coil 60 can be estimated with precision while impedance variation unit 80 does not include the function adjusting the input impedance to have a fixed value as the load 3 impedance varies while receiving electric power.

Furthermore in the above embodiment primary coil 20 is used to supply primary self resonant coil 30 with electric power through electromagnetic induction and secondary coil 70 is used to extract electric power from secondary self resonant coil 60 through electromagnetic induction. Alternatively, primary coil 20 may be dispensed with and high frequency electric power supply device 10 may directly supply primary self resonant coil 30 with electric power, and secondary coil 70 may be dispensed with and secondary self resonant coil 60 may have electric power extracted directly therefrom.

Furthermore in the above description a pair of self resonant coils is resonated to transfer electric power. Alternatively, resonators in the form of the pair of self resonant coils may be replaced with those in the form of a pair of high dielectric disks. Each disk is formed of a material of a high dielectric constant, such as $TiO_2$, $BaTi_4O_9$, $LiTaO_3$, or the like.

Furthermore, while in the above description an electric motored vehicle having electric power receiving device 2 mounted therein has been described by way of example as a series/parallel type hybrid vehicle employing power split device 260 to split and thus transmit power of engine 250 to drive wheel 270 and motor generator 240, the present invention is also applicable to different types of hybrid vehicles. More specifically, the present invention is applicable for example to: a so called series type hybrid vehicle that employs engine 250 only for driving motor generator 240 and generates force only by motor generator 242 for driving the vehicle; a hybrid vehicle recovering only regenerated energy of kinetic energy that is generated by engine 250 as electrical energy; and a motor-assisted hybrid vehicle having an engine as a major power source and a motor as an assistant as required. Furthermore, the present invention is also applicable to an electric vehicle excluding engine 250 and traveling only on electric power, and a fuel cell vehicle including a direct current power supply implemented as power storage device 210 and in addition thereto a fuel cell.

Note that in the above description primary self resonant coil 30 and primary coil 20 correspond in the present invention to an embodiment of an "electric power transferring resonator" and secondary self resonant coil 60 and secondary coil 70 correspond in the present invention to an embodiment of an "electric power receiving resonator". Furthermore, impedance variation unit 80 corresponds in the present invention to an embodiment of an "impedance variation device".

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

Reference Signs List

1: electric power supplying equipment, 2: electric power receiving device, 3: load, 10: high frequency electric power supply device, 20: primary coil, 30: primary self resonant coil, 40: control device, 50: current measurement means, 55: voltage measurement means, 60: secondary self resonant coil, 70: secondary coil, 80: impedance variation unit, 200: hybrid vehicle, 210: power storage device, 220: boost converter, 230, 232: inverter, 240, 242: motor generator, 250: engine, 260: power split device, 270: drive wheel, 280: rectifier, 290: vehicular ECU, C1, C2: stray capacitance, SMR1, SMR2: system main relay, PL1, PL2: positive electrode line, NL: negative electrode line.

The invention claimed is:

1. Non-contact electric power supplying equipment comprising:
   an electric power transferring resonator for transferring electric power to an electric power receiving device in a non-contact manner by resonating with an electric power receiving resonator of said electric power receiving device through an electromagnetic field;
   a power supply device connected to said electric power transferring resonator and generating predetermined high frequency voltage; and
   a control device for controlling said power supply device to control supplying or not supplying electric power from said electric power transferring resonator to said electric power receiving resonator, said control device controlling supplying electric power based on a characteristic in frequency of an impedance varying with a distance between said electric power transferring resonator and said electric power receiving resonator.

2. The non-contact electric power supplying equipment according to claim 1, wherein said control device estimates the distance between said electric power transferring resonator and said electric power receiving resonator from said characteristic in frequency of the impedance, and controls supplying electric power, based on that estimated distance.

3. The non-contact electric power supplying equipment according to claim 2, wherein said control device performs supplying said electric power receiving device with electric power when the distance estimated from said characteristic in frequency of the impedance is equal to or smaller than a predetermined value.

4. The non-contact electric power supplying equipment according to claim 2, wherein said control device estimates the distance between said electric power transferring resonator and said electric power receiving resonator from a characteristic in amplitude of said characteristic in frequency of the impedance varying with the distance between said electric power transferring resonator and said electric power receiving resonator.

5. The non-contact electric power supplying equipment according to claim 2, wherein said control device estimates the distance between said electric power transferring resonator and said electric power receiving resonator from a characteristic of a phase of said characteristic in frequency of the impedance varying with the distance between said electric power transferring resonator and said electric power receiving resonator.

6. The non-contact electric power supplying equipment according to claim 1, wherein said control device determines from said characteristic in frequency of the impedance whether said electric power receiving device needs to receive electric power and whether supplying said electric power receiving device with electric power can be done, and if said control device determines that supplying said electric power receiving device with electric power can be done, said control device controls said power supply device to generate a voltage having a resonant frequency determined from a singular point of said characteristic in frequency of the impedance.

7. The non-contact electric power supplying equipment according to claim 1, further comprising:
current measurement means for detecting a current input to said electric power transferring resonator; and
voltage measurement means for detecting a voltage input to said electric power transferring resonator, wherein
said control device controls said power supply device to output a predetermined small electric power to said electric power receiving device at a plurality of frequencies in a predetermined frequency band, and calculates said characteristic in frequency of the impedance from the voltage detected by said voltage measurement means and the current detected by said current measurement means.

8. The non-contact electric power supplying equipment according to claim 1, wherein said electric power transferring resonator includes:
a primary coil connected to said power supply device; and
a primary self resonant coil fed with electric power from said primary coil through electromagnetic induction and generating said electromagnetic field.

9. A non-contact electric power receiving device comprising:
an electric power receiving resonator for receiving electric power from electric power supplying equipment in a non-contact manner by resonating with an electric power transferring resonator of said electric power supplying equipment through an electromagnetic field; and
an impedance variation device for varying an impedance, depending on whether receiving electric power from said electric power supplying equipment is necessary, so that whether receiving electric power from said electric power supplying equipment is necessary can be determined at said electric power supplying equipment from a characteristic in frequency of the impedance and if it is determined that it is not necessary to receive electric power from said electric power supplying equipment, the electric power supplying equipment will not supply electric power.

10. The non-contact electric power receiving device according to claim 9, wherein when receiving electric power from said electric power supplying equipment ends, said impedance variation device varies an input impedance so that that receiving electric power ends can be detected at said electric power supplying equipment from said characteristic in frequency of the impedance.

11. The non-contact electric power receiving device according to claim 9, wherein said impedance variation device varies the impedance, depending on whether receiving electric power from said electric power supplying equipment is necessary, so that whether receiving electric power from said electric power supplying equipment is necessary can be determined at said electric power supplying equipment from an S-parameter S11 of a circuit constituted of said electric power transferring resonator and said electric power receiving resonator.

12. The non-contact electric power receiving device according to claim 11, wherein when receiving electric power from said electric power supplying equipment ends, said impedance variation device varies an input impedance so that that receiving electric power ends can be detected at said electric power supplying equipment from said S-parameter S11.

13. A non-contact electric power supplying system comprising:
electric power supplying equipment capable of outputting predetermined high frequency electric power; and
an electric power receiving device capable of receiving electric power from said electric power supplying equipment in a non-contact manner, wherein said electric power supplying equipment including:
a power supply device for generating predetermined high frequency voltage;
an electric power transferring resonator connected to said power supply device, and receiving electric power from said power supply device and generating an electromagnetic field; and
a control device for controlling said power supply device to control supplying or not supplying electric power from said electric power transferring resonator to said electric power receiving device, said electric power receiving device including:
an electric power receiving resonator for receiving electric power from said electric power transferring resonator in a non-contact manner by resonating with said electric power transferring resonator through said electromagnetic field,
said control device controlling supplying electric power, based on a characteristic in frequency of an impedance varying with a distance between said electric power transferring resonator and said electric power receiving resonator.

14. The non-contact electric power supplying system according to claim 13, wherein said control device estimates the distance between said electric power transferring resonator and said electric power receiving resonator from said characteristic in frequency of the impedance, and controls supplying electric power, based on that estimated distance.

15. The non-contact electric power supplying system according to claim 14, wherein said control device performs supplying said electric power receiving device with electric power when the distance estimated from said characteristic in frequency of the impedance is equal to or smaller than a predetermined value.

16. The non-contact electric power supplying system according to claim 13, wherein:
said electric power receiving device further includes an impedance variation device configured to be capable of varying an impedance of the electric power receiving device when receiving electric power from said electric power supplying equipment ends; and said control device uses a previously obtained characteristic in frequency of the impedance provided when said impedance variation device varies the impedance in said electric power receiving device, to detect from said characteristic in frequency of the impedance that said electric power receiving device is varied in impedance as receiving electric power ends, and based on that detected result said control device stops supplying said electric power receiving device with electric power.

17. The non-contact electric power supplying system according to claim 13, wherein:
said electric power transferring resonator includes
a primary coil connected to said power supply device, and
a primary self resonant coil fed with electric power from said primary coil through electromagnetic induction and generating said electromagnetic field; and
said electric power receiving resonator includes
a secondary self resonant coil for receiving electric power from said primary self resonant coil by resonating with said primary self resonant coil through said electromagnetic field, and
a secondary coil for extracting through electromagnetic induction the electric power received by said secondary self resonant coil.

18. The non-contact electric power supplying equipment according to claim 1, wherein said control device controls supplying electric power based on an S-parameter S11 of a circuit constituted of said electric power transferring resonator and said electric power receiving resonator, said S-parameter S11 varying with the distance between said electric power transferring resonator and said electric power receiving resonator.

19. The non-contact electric power supplying equipment according to claim 18, wherein said control device estimates the distance between said electric power transferring resonator and said electric power receiving resonator from said S-parameter S11, and controls supplying electric power, based on that estimated distance.

20. The non-contact electric power supplying system according to claim 13, wherein said control device controls supplying electric power based on an S-parameter S11 of a circuit constituted of said electric power transferring resonator and said electric power receiving resonator, said S-parameter S11 varying with the distance between said electric power transferring resonator and said electric power receiving resonator.

* * * * *